(12) United States Patent
Berrio

(10) Patent No.: US 8,997,511 B2
(45) Date of Patent: Apr. 7, 2015

(54) HEATING OR COOLING SYSTEM FEATURING A SPLIT BUFFER TANK

(76) Inventor: Denering Berrio, Calgary (CA)

( * ) Notice: Subject to any disclaimer, the term of this patent is extended or adjusted under 35 U.S.C. 154(b) by 1188 days.

(21) Appl. No.: 12/887,141

(22) Filed: Sep. 21, 2010

(65) Prior Publication Data

US 2012/0067300 A1   Mar. 22, 2012

(51) Int. Cl.
F24J 2/04 (2006.01)
F24D 11/00 (2006.01)
F24D 11/02 (2006.01)
F24H 9/12 (2006.01)
F28D 20/00 (2006.01)

(52) U.S. Cl.
CPC .......... *F24D 11/004* (2013.01); *F24D 11/0228* (2013.01); *F24D 2200/11* (2013.01); *F24D 2200/12* (2013.01); *F24H 9/124* (2013.01); *F28D 20/0039* (2013.01); *F28D 2020/0095* (2013.01); *Y02B 10/40* (2013.01); *Y02B 10/70* (2013.01); *Y02E 60/142* (2013.01); *Y02B 30/126* (2013.01)

(58) Field of Classification Search
USPC ........ 236/1 C; 126/640, 362.1; 392/450, 499; 122/19.1; 62/235.1; 137/597, 861, 862; 138/39
See application file for complete search history.

(56) References Cited

U.S. PATENT DOCUMENTS

| | | | | |
|---|---|---|---|---|
| 2,486,833 A * | 11/1949 | Freund | ............. | 62/235.1 |
| 3,383,495 A * | 5/1968 | Laube et al. | ............. | 392/450 |
| 3,962,560 A * | 6/1976 | Braathen | ............. | 392/456 |
| 4,027,821 A * | 6/1977 | Hayes et al. | ............. | 126/588 |
| 4,140,104 A * | 2/1979 | Itagaki | ............. | 126/374.1 |
| 4,182,489 A * | 1/1980 | Lessieur | ............. | 126/586 |
| 4,390,008 A * | 6/1983 | Andrews | ............. | 126/611 |
| 4,420,032 A * | 12/1983 | Van Koppen et al. | ............. | 165/236 |
| 4,501,262 A * | 2/1985 | Lyon | ............. | 126/640 |
| 4,523,629 A * | 6/1985 | Copeland | ............. | 165/104.19 |
| 4,593,169 A * | 6/1986 | Thomas | ............. | 219/688 |
| 5,507,946 A * | 4/1996 | Stearns | ............. | 210/202 |
| 5,596,952 A * | 1/1997 | Lannes et al. | ............. | 122/14.1 |
| 5,823,177 A * | 10/1998 | Whitehead | ............. | 126/640 |
| 5,898,818 A * | 4/1999 | Chen | ............. | 392/449 |
| 6,098,955 A * | 8/2000 | Ruiz | ............. | 251/120 |
| 6,302,062 B2 * | 10/2001 | Overbey et al. | ............. | 122/13.01 |
| 6,907,923 B2 * | 6/2005 | Sienel | ............. | 165/236 |
| 8,567,689 B2 * | 10/2013 | Eisenhower et al. | ............. | 237/8 A |
| 2004/0234255 A1 * | 11/2004 | Yui | ............. | 392/450 |
| 2006/0117769 A1 * | 6/2006 | Helt et al. | ............. | 62/161 |

(Continued)

*Primary Examiner* — Marc Norman
*Assistant Examiner* — Max Snow
(74) *Attorney, Agent, or Firm* — Kyle R. Satterthwaite; Ryan W. Dupuis; Ade & Company Inc.

(57) ABSTRACT

This invention relates to a heating/cooling system operating on the basis of a novel SPLIT BUFFER TANK; representing an efficiency improvement alternative to HVAC systems functioning with existing commercial buffer tanks. Currently, commercial buffers have the heat source provider (HSP)-return and system-return discharging to a common buffer/vessel. Novel SPLIT BUFFER is provided with a SEPARATION DISK placed inside the tank as mechanical way of separating the hot water inflow from the HSP from the warmer water inflow from system return. The disk moves up and down along the tank driven by demanded water supply and return. Pump-1 circulates hot water from the hot section of the buffer to the secondary system claiming for heat. Pump-2 circulates warmer water from the warmer section of the buffer through the HSP where it is reheated, and subsequently stored in the hot section of the buffer to reinitiate this cycle again.

15 Claims, 12 Drawing Sheets

(56) References Cited

U.S. PATENT DOCUMENTS

| | | | |
|---|---|---|---|
| 2008/0050105 A1* | 2/2008 | Yui | 392/450 |
| 2008/0147465 A1* | 6/2008 | Raines et al. | 705/7 |
| 2008/0240692 A1* | 10/2008 | Eberle | 392/449 |
| 2009/0250085 A1* | 10/2009 | Gaus et al. | 134/56 D |
| 2010/0290763 A1* | 11/2010 | Boulay et al. | 392/451 |
| 2011/0168159 A1* | 7/2011 | Lataperez et al. | 126/400 |

\* cited by examiner

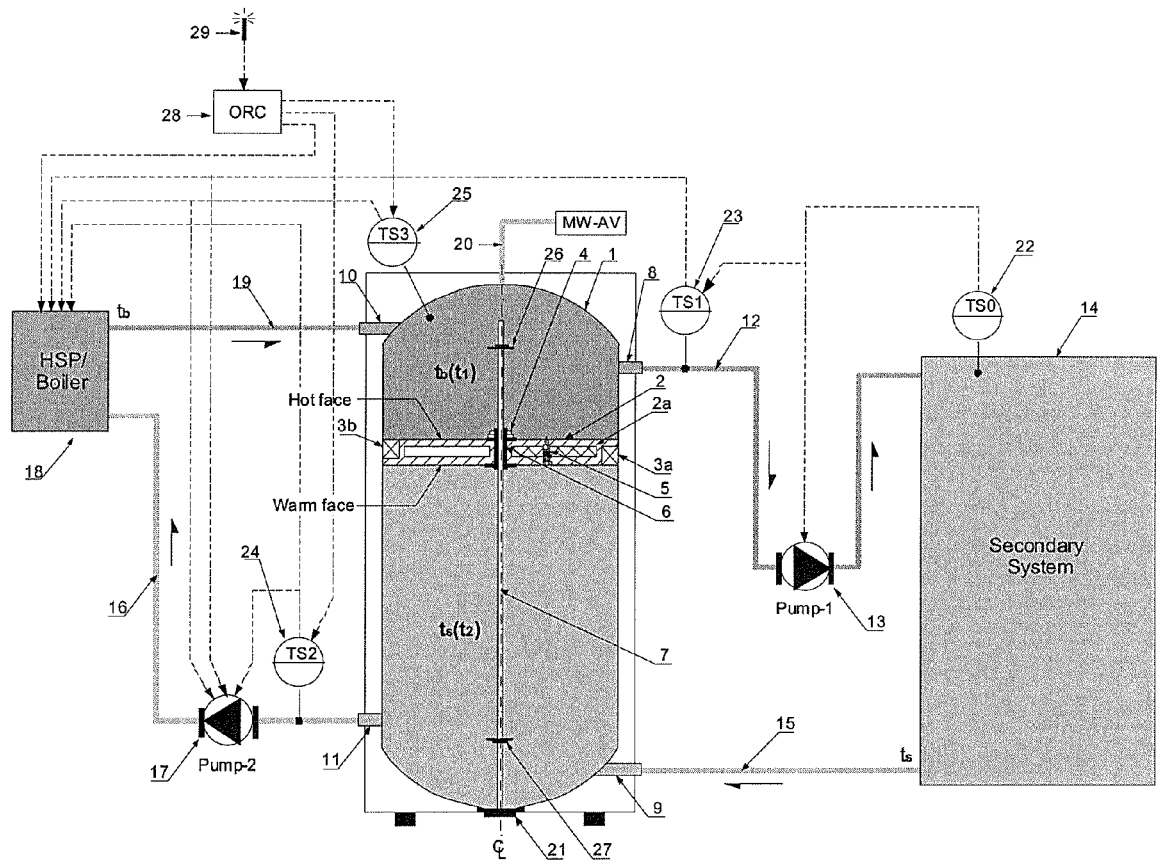

1- Split buffer tank
2- Separation disk (Disk)
2a- Disk core insulation
3a- Warm-side bypass
3b- Hot-side bypass
4- Counterweight plates
5- Pressure release check valve
6- Separation disk hub
7- Guide bar
8- Buffer hot outlet
9- Buffer warm inlet
10- Buffer hot inlet
11- Buffer warm outlet
12- Buffer system supply line
13- Pump-1/System pump 14- Secondary system
15- Buffer system return line
16- Buffer HSP/boiler supply line
17- Pump-2/HSP/boiler pump
18- Heat Source Provider (HSP)/boiler
19- Buffer HSP/boiler return line
20- Water/brine make-up & Air vent connection
21- Guide bar attachment
22- TS0/Secondary system temperature sensor
23- TS1/Buffer system supply temperature sensor
24- TS2/Buffer HSP/boiler supply temperature sensor
25- TS3/Split buffer temp sensor
26- Top position disk stopper
27- Bottom position disk stopper
28- Outdoor reset control
29- Outdoor temperature bulb sensor

FIG.1

PRIOR ART

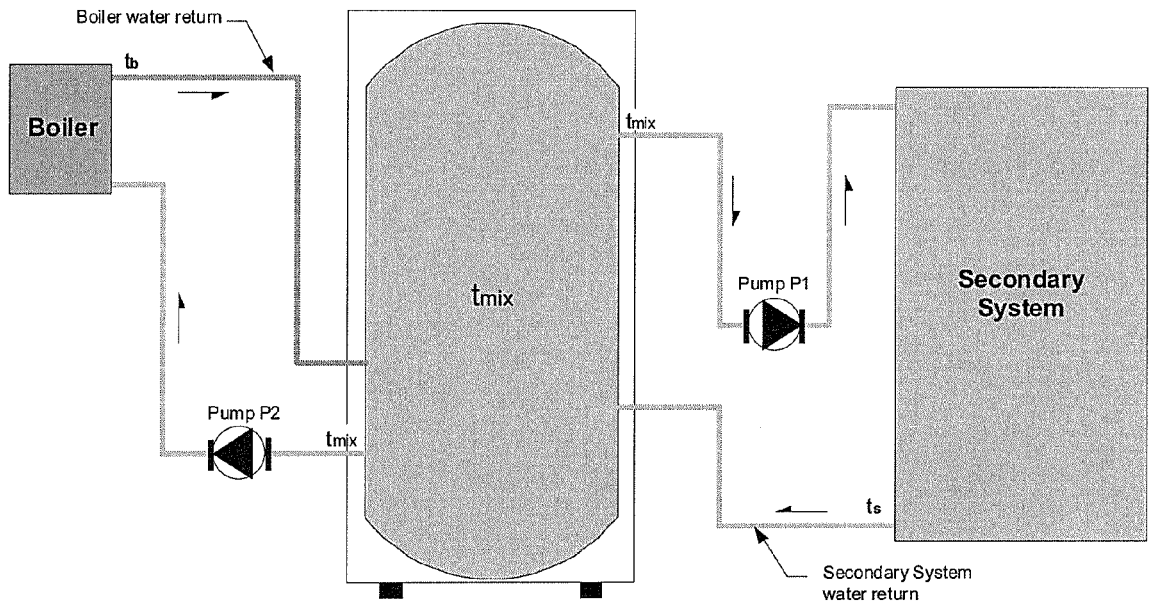

$$t_{mix} = (t_b + t_s) / 2$$

$t_b$   Water/brine temperature at boiler outlet. Considered equal to $t_1$ (See Figure-1) when no heat losses occur in pipe connection between boiler and buffer $t_s$   Water/brine temperature at system return. Considered equal to $t_2$ (See Figure-1) when no heat losses occur in pipe connection between system and buffer $t_{mix}$   Water/brine Temperature from mixture of warm and hot water if there is no separation disk (as it happened in existing commercial buffers).

FIG.2

PRIOR ART

Simplified Condensing Boiler Steady-State Thermal Efficiency As A Function Of Return Water Temperature.
Cooke 2005. "*Condensing Boiler Technology*". Presentation made by Jim Cooke of Mechanical Systems NorthWest to the Puget Sound ASHRAE Chapter in Nov 2005. Available at <www.pugetsoundashrae.org/PDF_files/AshraeCondensingtechnology.ppt>. Accessed November 22, 2009

PRIOR ART

Case (a)　　　　　　　Case (b)　　　　　　　Case (c)

Cutaway A-A

HEATING OR COOLING SYSTEM FEATURING A SPLIT BUFFER TANK

FIELD OF THE INVENTION

The present invention relates generally to a heating/cooling system featuring a buffer tank, and more particularly to such a system employing a split buffer tank configured to separate hot heat source provider flow return from warm secondary system flow return.

BACKGROUND OF THE INVENTION

To better illustrate the nature of the invention, take for instance the case of a condensing boiler as a heat source provider (HSP). It is common to find all variety of brands and models operating at steady-state-efficiency levels from 70-80% for non-condensing to 82-98% for condensing. Steady-state Efficiency—refers to a measuring parameter for boiler maximum efficiency capability assessed under a controlled steady test and carried out by recognizable standard certification bureau. In the test, parameters such as air-intake temperature and volume, air/gas mixture, water/brine temperature/flow entering/leavening the boiler, system heat demand, and some others, are all fixed during boiler firing to obtain a better judgment of its efficiency at artificial steady state conditions. Test Standards for Gas-Fired Boilers. CGA P.2-1991 (R1999)/ENERGY START Canada, and the U.S. Department of Energy's/Title 10/Code of Federal Regulations for the Energy Conservation Program for Consumer Products, make indications that during the steady state testing of a condensing boiler water outlet temperature shall be at 180° F./82° C. and inlet temperature shall be at 80° F./26.7° C. at all times.

Drifting away from the stationary conditions dictated by the test, it arrives at the real world, a different place. A world loaded with always changing conditions where lab subsets are not so frequently encountered during the operating life span of the boiler. To complicate matters, there appears the need for adding buffer capacity in order to eliminate problems associated with excessive cycling, poor temperature control, and erratic system operation. The HVAC industry learned a long time ago that it was by adding a buffer tank to the boiler-system that they resolved all these problems. However, one issue remains unsolved. That is, the loss of the boiler high efficiency during continuous operation due to the water mixing inside the tank. But with no solution on hand, they were forced to look the other way.

In today's commercial buffers (See FIG. 2), boiler water-return at temperature $t_b$ and secondary system water-return at temperature $t_s$ easily get mixed in the buffer because of the lack of mechanical medium capable of isolating the encountering of the two flows inside the tank (See also FIG. 4). This mixed water at temperature equal $t_{mix}$ when going to the boiler produces the same effect on efficiency behavior as the one depicted in FIG. 3. There, and independent study (by Jim Cooke) shows how condensing and non-condensing boilers thermal efficiency gets influenced by water return temperature during steady-state conditions. Cooke's study also shows thermal efficiency behavior for a condensing boiler at three different firing rates (33/67/100%).

FIG. 4 shows some water/brine supply/return hydraulic connections for some brand name buffer tanks and their prevailing flow pattern when all intakes/outlets are in used. Water/brine motion inside the buffer not only gets affected by physical characteristics of the system such as pumps flow, buffer diameter and height, inlet/outlet configuration, among other variables, but also by changing set of dynamic conditions regulated by DCS (Distributed Control System). Flow patterns in the buffer are chaotic and unpredictable with limited opportunities for creating stratification conditions. For this to occur pumped flow coming from HSP/boiler and/or secondary system need to be slowed down to such extent that entering speed must be close to laminar flow. Only such minimal disturbance in the body of water inside the tank will have no major mixing effect in the natural convection phenomenon associated with stratification. From a design stand point this may lead to uneconomical alternatives such as having a much bigger diameter for piping inlet/outlet connections, otherwise designed with acceptable velocity of 2.1±0.9 m/s (7±3 ft/s) for normal liquid service applications, with maximum velocity of 2.1 m/s (7 ft/s) at piping discharge points. Perhaps even requiring a buffer tank with oversize uneconomical dimensions in diameter and/or height. This, without mentioning the time factor to allow the stratification process to evolve and settled in a constant demand HVAC system.

The more realistic assumption is that any flow leaving the buffer will do so at a temperature $t_{mix}$.

From FIG. 2 and FIG. 4 it may be concluded that:

$$t_{mix}=(t_b+t_s)/2$$

$t_b$ Water/brine temperature at boiler outlet. Considered equal to $t_1$ (See FIG. 1) when no heat losses occur in pipe connection between boiler and buffer $t_s$ Water/brine temperature at system return. Considered equal to $t_2$ (See FIG. 1) when no heat losses occur in pipe connection between system and buffer $t_{mix}$ Water/brine temperature from the mixture of warm and hot water if there is no separation disk (as it happens in existing commercial buffers). Water temperature going to the boiler $t_1$ Water temperature from hot section of the buffer to the secondary system $t_2$ Water temperature from Secondary System to warm section of the buffer $t_1-t_2$ Delta temperature. $Q=W\times C_p\times(t_2-t_1)$ Q Secondary system heat demand. $Q=W\times C_p\times(t_2-t_1)$ Using data results from chart on FIG. 3 and applying the same analogy to evaluate water return/supply configuration on boiler efficiency for the typical commercial buffer connections on FIG. 4; It may be proven that when water gets mixed in the buffer and returned to the boiler at mixed temperature $t_{mix}$, it will produce the same effect on the thermal efficiency of the boiler. As flow pattern and temperature of the mix evolve over time, the rising temperature of the water/brine will increasingly hamper its ability to quickly regain thermal energy when recirculating through the boiler, resulting in longer less efficient runs with increasingly unnecessary consumption of energy resources (See FIG. 6). This in turn will force chimney gases to escape the boiler without fully rendering their caloric load.

When dealing with condensing boilers it is crucial to realize that continuous 80° F./26.7° C. water-return and below is the determinant factor in achieving continuous outstanding higher efficiencies (See chart on FIG. 3); and that, boilers serving a buffer/system in which mixed water return temperature does not fall below 80° F./26.7° C. will never meet the necessary temperature requirements for achieving such continuous performance. Ignoring this fact, when justifying a boiler selection, will result in having a boiler that cost 50% more than necessary (comparing to condensing boiler) and achieves, from time to time, just above condensing boiler performance.

Currently buffer technology has not corrected the problems created with usual configurations such as the one on FIG. 4 (and the like); and as a result, its usage just exacerbate the sub-utilization of condensing boilers in boiler/buffer/systems that ONLY occasionally allow condensation to occur.

SUMMARY OF THE INVENTION

According to a first aspect of the invention there is provided a heating/cooling system comprising a heat source provider, a secondary system, and a novel split buffer tank that comprises a separations disk, to make room for hot and warm fluid storage on opposite sides of the disk, a sealed relationship between a periphery of the separation disk and an internal surface of a peripheral wall of the split buffer tank, two disk flow bypasses defined on the separation disk inside the tank for respective loop flow functionality between the split buffer tank and each of the heat source provider and the secondary system, and hydraulic connections to interconnect the heat source provider and the secondary system to the split buffer tank, wherein the hydraulic connections include a respective pair of supply and return lines for each of the heat source provider and the secondary system, and in each respective pair of supply and return lines, one of said supply and return lines is only hydraulically connected with the tank on one side of the disk and the other of said supply and return lines is only hydraulically connected with the tank at an area thereof that is either located on the other side of the disk, or is located at a position aligned with a respective one the disk flow bypasses, depending on the position of the disk, whereby the disk and the sealed relationship thereof with the peripheral wall of the tank hydraulically isolate tank contents on one side of the disk from tank contents on the other side of the disk.

Preferably the heat source provider is hydraulically connected to the split buffer tank.

Preferably the secondary system (14) is hydraulically connected to the split buffer tank.

Preferably buffer heat source provider return line serves as hydraulic connection to convey hot fluid from the heat source provider into a hot section of the split buffer tank on a hot side of the disk.

Preferably a buffer heat source provider supply line serves as hydraulic connection to convey warm fluid from a warm section of the split buffer tank on a warm side of the disk to the heat source provider.

Preferably a buffer system supply line serves as hydraulic connection to convey hot fluid from a hot section of the split buffer tank on a hot side of the disk to the secondary system.

Preferably a buffer system return line serves as hydraulic connection to convey warm fluid from the secondary system to a warm section of the split buffer tank on a warm side of the disk.

Preferably the split buffer tank (1) comprises the following:

(a) a hot-outlet hydraulically connected to a buffer system supply line to convey stored hot fluid from the split buffer tank to the secondary system to satisfy demand for heat;

(b) a warm-inlet hydraulically connected to a buffer system return line to convey secondary system return warm fluid to split buffer tank for storage;

(c) a hot-inlet hydraulically connected to a buffer heat source provider return line to convey hot fluid from the heat source provider to the split buffer tank for storage;

(d) a warm-outlet hydraulically connected to a buffer heat source provider supply line to convey stored warm fluid from the split buffer tank to the heat source provider for reheating;

(e) the separation disk, which functions to hydraulically separate hot fluid inflow from the heat source provider from warm fluid inflow from the secondary system, and to serve as an insulating wall for thermal separation between hot and warm sections of the tank, the separation disk comprising the following:
  i) an insulating core which functions to thermally insulate the hot section of the split buffer tank from the warm section;
  ii) a separation disk warm-side bypass to allow a pump-1 to recirculate fluid in a system loop during positioning of the disk in a top position;
  iii) a separation disk hot-side bypass to allow pump-2 to recirculate fluid in a heat source provider loop during positioning of the disk in a bottom position; and
  iv) a pressure release check valve hydraulically connecting a hot face of the disk with a warm face of the disk in order to eliminate pressure differential between the hot and warm sections of the tank that may arise from a make-up fluid connection on the split buffer tank;

f) the guide bar, which is a center guide squared bar to guide the separation disk up and down along the split buffer tank and to prevent rotation of the disk from causing misalignment of the warm-side bypass with the hot outlet (8), or the hot-side bypass with the warm outlet (11), at an edge of the separation disk, the disk being displaceable up and down along the center guide bar to allow hot and warm fluid accumulation during thermal recharging and discharging of the split buffer tank;

g) a separation disk hub to secure the separation disk to the center guide bar and to accommodate a set of counterweight plates;

h) the set of counterweight plates balancing buoyancy of the separation disk to make the separation disk effectively weightless when placed in the fluid medium inside the split buffer tank;

i) a top position disk stopper to limit displacement of the disk when going to the top position lining up the warm-side bypass with the hot outlet;

j) a bottom position disk stopper to limit displacement of the disk when going to the bottom position, lining up the hot side bypass with the warm outlet;

k) a guide bar attachment to mechanically secure the guide bar to a bottom of the split buffer tank; and l) a pressurized fluid make-up & air vent connection to maintain continuous fluid supply to the system and to allow for allocation of air vent equipment in association with the split buffer tank.

Preferably there is provided a Distributed Control System (DCS) logic that is arranged to work independently or in conjunction with additional DCS controllers and comprises the following:

a) a demand-based sensor/selector inside the Secondary System perimeter which functions to monitor an inner temperature and call for heat, starting a Pump-1 operable between the buffer tank and the secondary system, if the inner temperature falls below a preset value;

b) a fluid temperature sensor/selector located at a buffer system supply line, between a hot outlet of the buffer tank and the pump-1, the temperature sensor/selector registering a first point fluid temperature, operating only when the pump-1 is ON, and if the first point fluid temperature falls below a set point, signaling to start first a pump-2 operable between the buffer tank and the heat source provider and, with a time delay, start the heat source provider to reload the split buffer tank with hot fluid; and c) another fluid temperature sensor/selector located at a buffer heat source provider supply line, between a buffer tank warm outlet and pump-2 to register a second point fluid temperature and shut-off the pump-2, and with time delay, shut off the heat source provider if the second point fluid temperature rises to a second preset value.

The split buffer tank is preferably insulated to retain heat, provided with medium to high pressure capabilities and suitable to operate at higher than normal temperatures.

The heat source provider may feature any direct heating device such as gas/oil boiler, heat pump, solar plant (solid fuel), wood pellet/log and/or any district heating, or indirect heating device operated via integrated heat exchangers or external flat plate heat exchanger.

The secondary system may feature any HVAC applications for office buildings, industrial facility or any other closed environment, where safe and healthy building conditions are regulated with temperature and humidity, as well as "fresh air" from outdoors. Also any industrial thermal processes involving cooling/heating applications.

According to another aspect of the invention, there is provided a heating/cooling system comprising a heat source provider, a secondary system, and a split buffer tank that comprises a separation disk freely movable upward and downward within the split buffer tank to make room for hot and warm fluid storage on opposite sides of the disk, a sealed relationship between a periphery of the separation disk and an internal surface of a peripheral wall of the split buffer tank, two disk flow bypasses defined on the separation disk inside the tank for respective loop flow functionality between the split buffer tank and each of the heat source provider and the secondary system, and hydraulic connections to interconnect the heat source provider and the secondary system to the split buffer tank, wherein: the tank comprises first and second disk stoppers disposed respectively proximate to opposing first and second ends of the tank in order to block movement of the disk past respective stop positions abutted against said disk stoppers; the hydraulic connections comprise a secondary system supply line connected to the secondary system and opening into the tank through a circumferential wall thereof near the first end of the tank, a heat source provider supply line connected to the heat source provider and opening into the tank through the circumferential wall near the second end of the tank, a secondary system return line connected to the secondary system and opening into the tank between the heat source provider supply line and the second end of the tank, and a heat source provider return line connected to the heat source provider and opening into the tank between the secondary system supply line and the first end of the tank; and the disk flow bypasses comprise a hot side bypass having one axially-opening end at a first face of the disk that faces toward the first end of the tank and a radially-opening end at the periphery of the disk at a position that aligns with the heat source provider supply line when the disk is in the second stop position, and a warm side bypass having one axially-opening end at a second face of the disk that faces toward the second end of the tank and another open end at the periphery of the disk at a position that aligns with the secondary system supply line when the disk is in the first stop position, whereby looped flow through the secondary system is enabled by the warm side bypass in the second stop position of the disk and looped flow through the heat source provider is enabled by the hot side bypass in the first stop position of the disk.

BRIEF DESCRIPTION OF THE DRAWINGS

In the following drawings, which illustrate the exemplary embodiments of the present invention:

FIG. 1 schematically illustrates a heating/cooling system operating with the novel invention of a split buffer tank FIG. 2 schematically illustrates a prior art boiler/system operating with an existing commercial buffer tank

DETAILED DESCRIPTION

1. General Character of the invention

Figure 3:
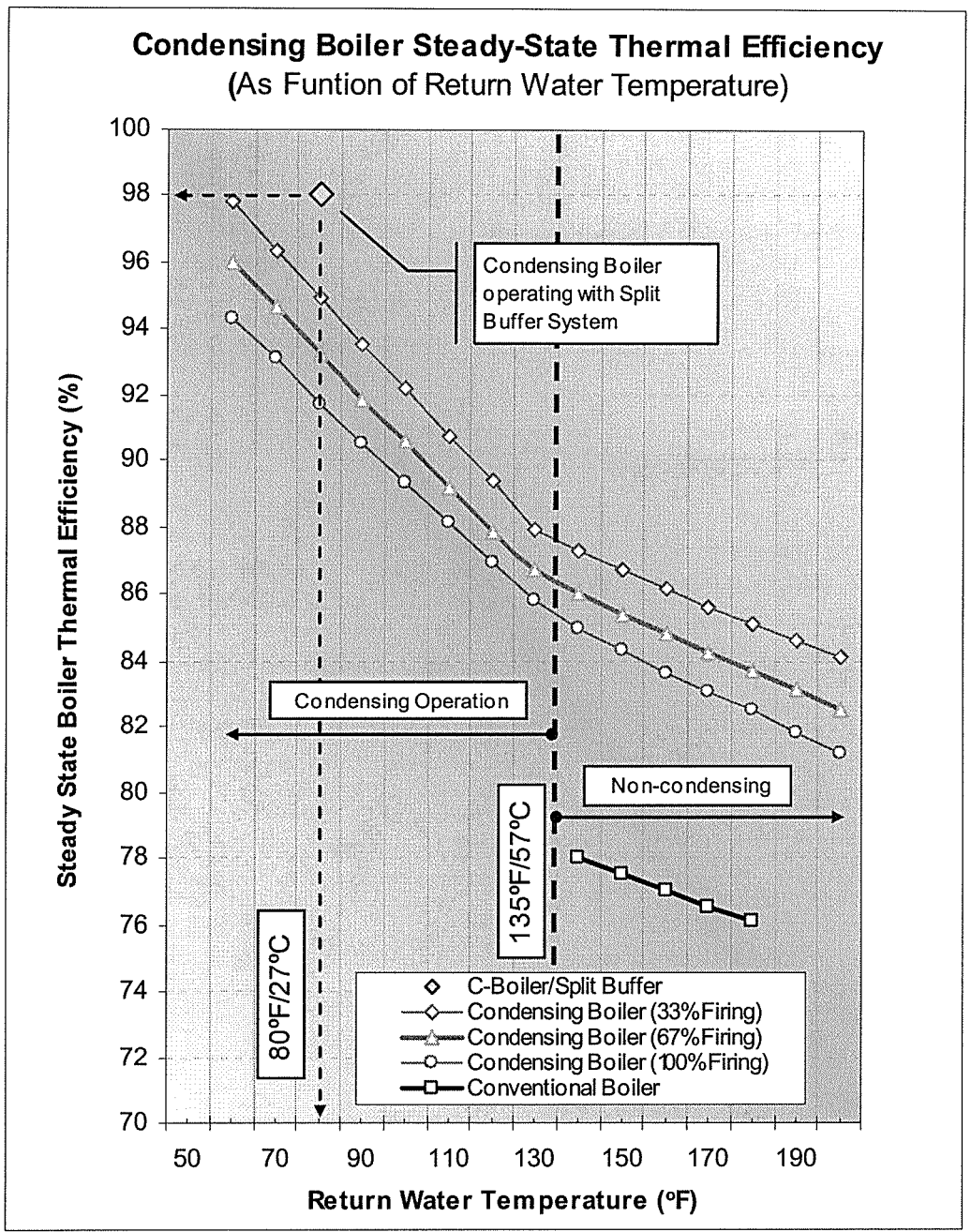
FIG. 3 shows a simplified chart for condensing and non-condensing boilers steady-state thermal efficiency as function of return water temperature FIG. 4 schematically illustrates prior art water/brine supply/return hydraulic connections for some commercial buffer tanks showing prevailing flow patterns.

The present invention relates to a heating/cooling system operating on the basis of a SPLIT BUFFER TANK, as shown in FIG. 1. Its design includes a mechanical disk (2) in order to separate the hot HSP flow return (19) from the warm secondary system flow return (15). Because both sections get thermally and hydraulically isolated one from each other, it favours the separation of the two bodies of water with different thermal properties. This in turn, allows the independent supply of water/brine to the secondary system at a steady high temperature serving the demand for heat, and steady low water/brine temperature to the HSP for reheating. Since steady state conditions for both flows are possible with this new invention, its use will maximize thermal operating efficiency for existing large sets of manufactured HVAC equipment. It alone will allow not only the step down on equipment sizes for a given set of thermal conditions, but also the decrease in the use of non-renewable natural resources and in the otherwise normally increasing maintenance costs. The HSP and the Secondary System work in a closed loop interconnected through the buffer/vessel. The term "water" or "brine" will be used indistinctively, meaning the fluid used within this closed loop. The name "System" is used herein to refer to the Secondary System, not the overall heating/cooling system.

2. Inventive Idea

In the case of the split buffer of the present invention (refer to FIG. 1), boiler water-return at temperature $t_b$ will never encounter system water-return at temperature $t_s$. Therefore, a constant flow of water to the boiler at $t_2$ will remain unchanged throughout the heat-loading operation, allowing the boiler to perform at very stable conditions closely mimicking lab subsets. With boiler operating at continuous high efficiency levels, buffer reloading will be carried out in shorter periods with saving in non-renewable energy resources, and time operation will be minimized, reducing boiler wearing and operational costs. On the system side, because now water/brine to the system can be delivered at continuous targeted high temperature, system HVAC equipment will see a significant improvement in their thermal transfer units (because of higher log median temperature differential, or LMTD). This alone will favor downsizing when considering the use of split buffer during the initial phase of HVAC system design.

Additional desirable key features can be added to the system that now can operate at continuous buffer system delivery targeted temperature and work with much lower water return temperature to the boiler. For example, less volume of water/brine will be needed to be pumped in order to be capable of carrying a bigger load to the system, smaller piping diameter with reduced pressure drops can be used, smaller handling systems with reduced heat exchangers can be used, and it would make sense to put effort in designing a system with water return temperature as low as possible since its purpose will not be defeated by buffer mixing. And lastly, it would be expected to have a smaller required boiler capacity more responsive to system loads and less costly to operate.

Figure 4:
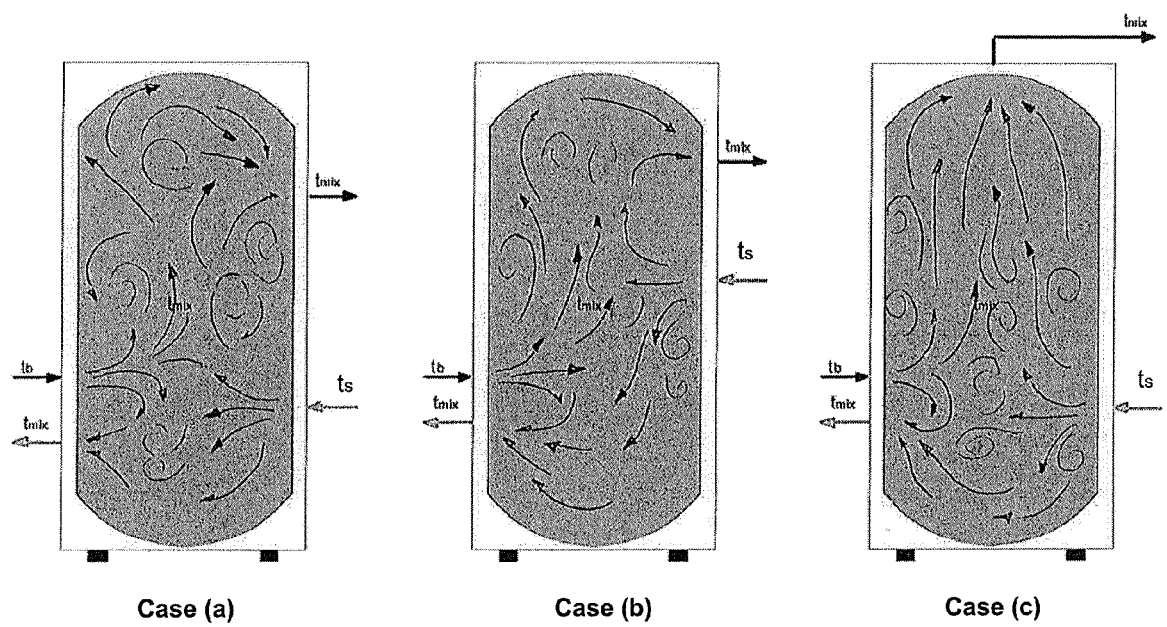
Figure 5:
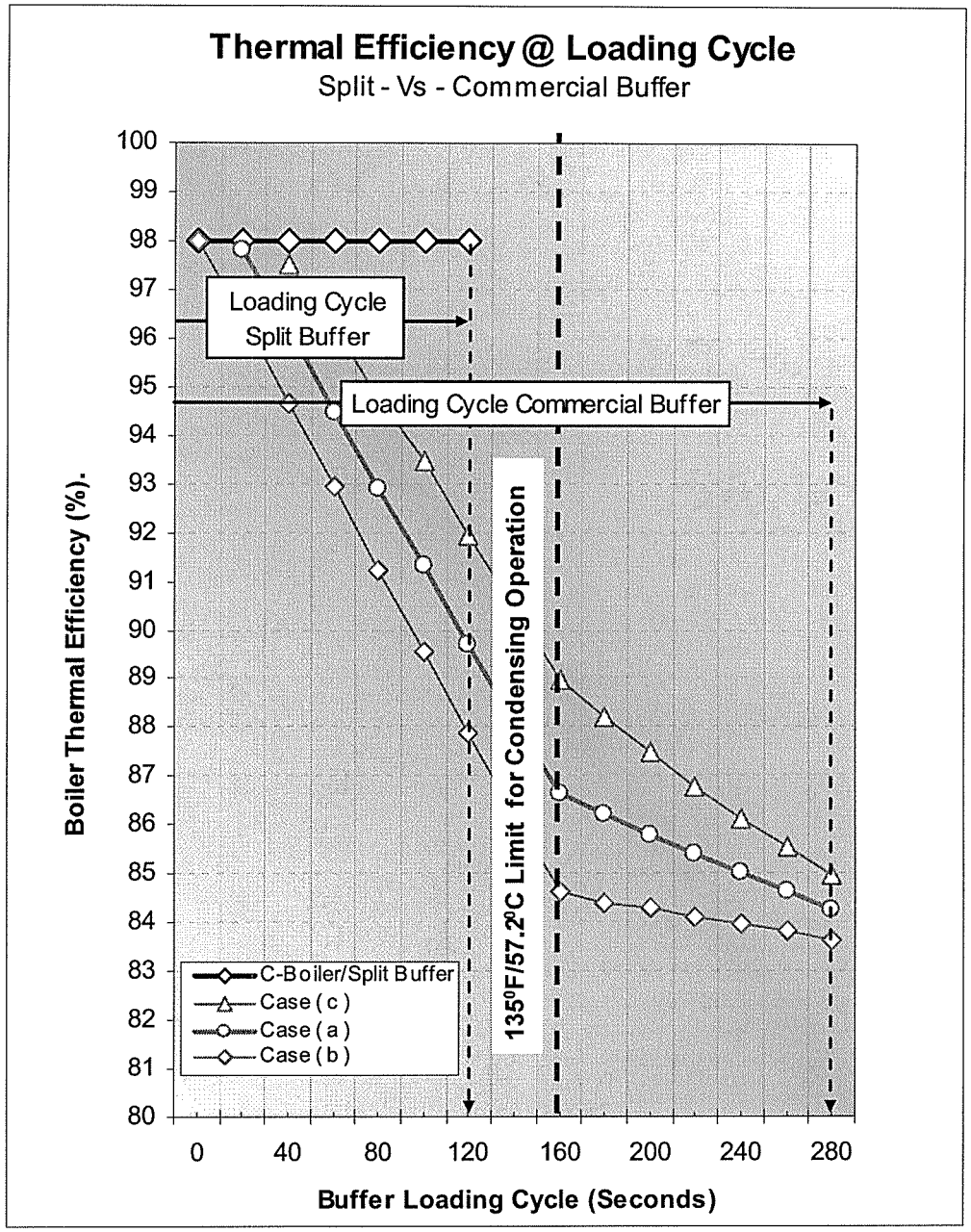
FIG. 5 shows boiler/buffer/system connections effect on time thermal efficiency
Figure 6:
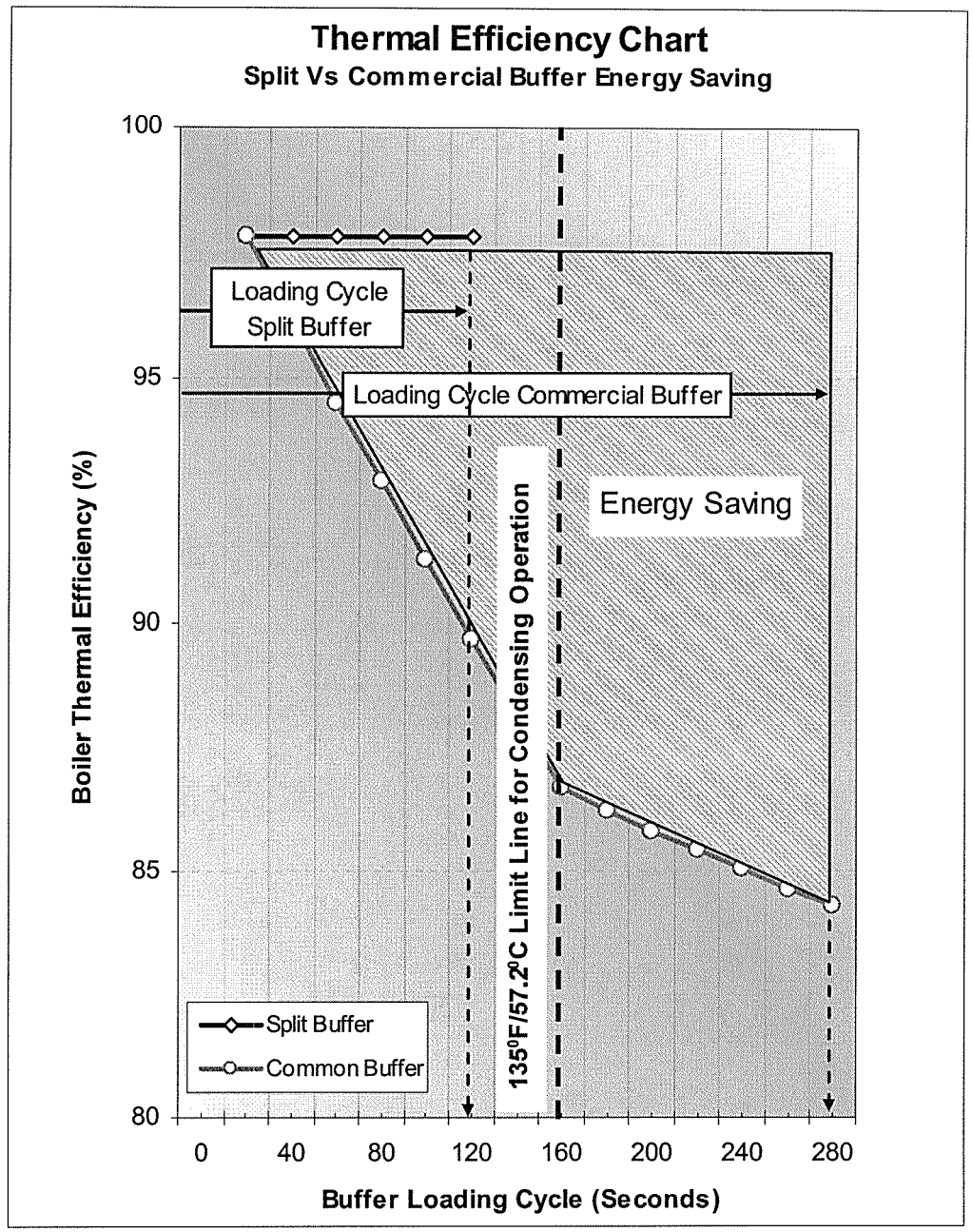
FIG. 6 shows split buffer Vs commercial buffer connection effect on energy savings FIG. 7a schematically illustrates a commercial buffer tank connection for a geothermal heat pump.

FIG. 5 shows the hypothetical effect of boiler/buffer connection configuration on thermal efficiency for the three scenarios considered in FIG. 4 with some additional considerations. The same boiler with best/middle/worst connections arrangement now working in a time evolving water mixing situation where the slope in the chart will indicates the speed of change by which thermal efficiency drops down for a given best/middle/worst case scenario. The dashed line at 120 seconds marks the time at which such boiler will finish thermal loading when operating with a novel split buffer (280 seconds when operating with commercial buffer). It can be observed that the split buffer operation provides an advantage when compare to commercial buffers. The elimination of water return mixing allows it to consistently perform (at 98% efficiency) enabling thermal reloading in shorter boiler time operation, see FIG. 6 (with lower energy resource spending, more rapid system response and less mechanical maintenance cost on the boiler).

Figure 7A:
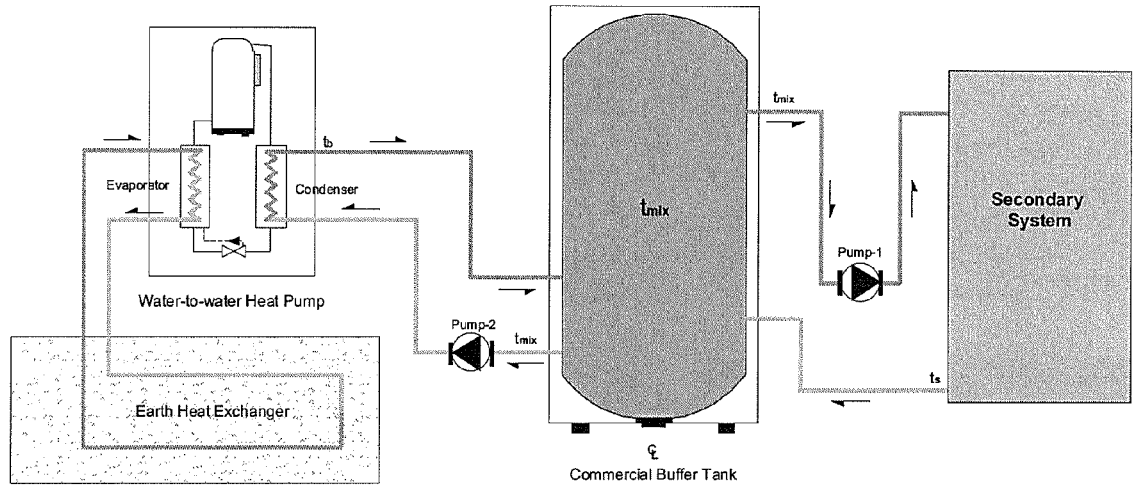
FIG. 7b schematically illustrates a split buffer tank connection for a geothermal heat pump
Figure 7B:
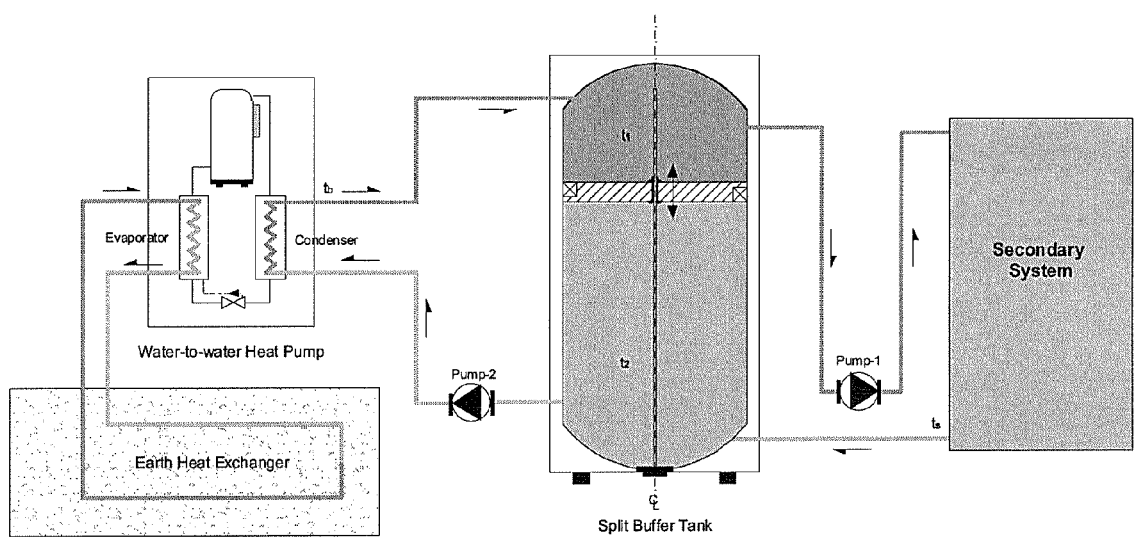
Figure 8:
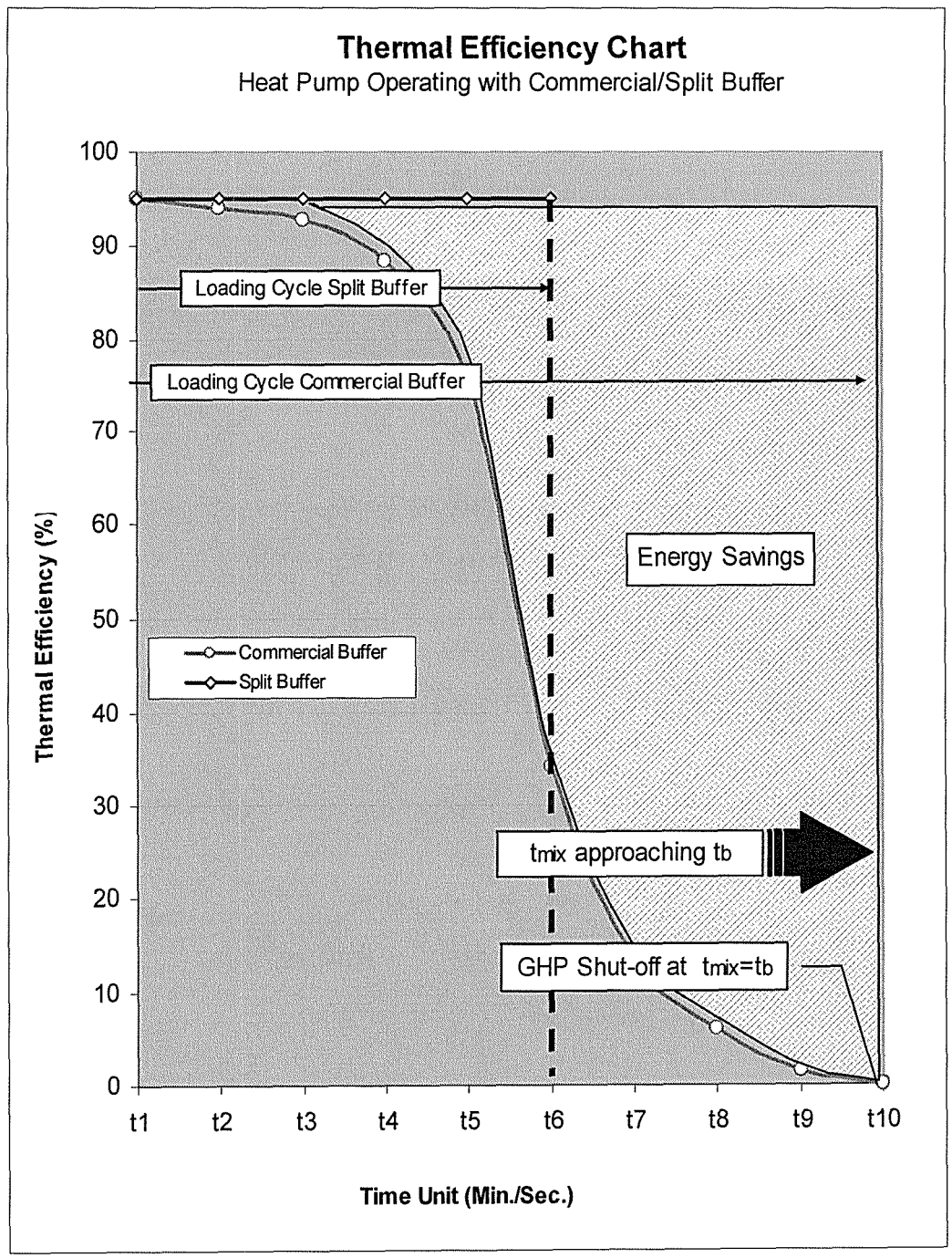
FIG. 8 shows geothermal heat pump/buffer/system connection effect on energy savings

In the case of a water-to-water geothermal heat pump (GHP) (see FIG. 7a, 7b), operating with any commercial buffers from FIG. 4, GHP brine return at temperature $t_b$ and system brine return at temperature $t_s$; again, easily get mixed in the buffer because of the lack of mechanical medium capable of isolating the encountering of the two flows inside the tank. This mixed water at temperature equal $t_{mix}=(t_b+t_s)/2$ when going to the GHP condenser or evaporator (depending on whether the GHP is in a heating mode—like that shown in FIG. 7a, or a cooling mode) will produce an LMTD much lower than the one generated when operating with the split buffer (1), with no mix (FIG. 7b). LMTD reduction will hamper the ability of the brine to quickly regain thermal energy and transport a higher load to the buffer in a shorter period of time; resulting, in longer GHP runs with increasing consumption of energy and equipment wearing. During buffer thermal loading operation, as $t_{mix}$ approaches $t_b$, LMTD tends to zero making the heating transferring process to become more critical. At this time, the rate of heat transfer via condenser/evaporator to the GHP brine will approximate slowly to zero, forcing the GHP to operate for a longer period time until $t_{mix}=t_b$ at time t10 (See chart on FIG. 8), and the system shuts-off.

Split buffer (1) offers operational advantages to GHP due to the ability to maintain a constant flow of low water temperature (high water temperature during reverse cycle) going to the GHP evaporator accelerating heating-loading time. The results, a more efficient GHP operation with lower running time, less energy consumption and lower maintenance cost. Special consideration should be given to Split Buffer (1) Distributed Control System which now needs to be reconditioned in order to perform not only on heating but cooling reverse cycle.

Similar analysis may be carried out for other Heat Source Providers (HSP) as part of any HVAC system with the same positive improvement in their operation.

2.1. Sequence of Operation

Heating/cooling cycle for the system in FIG. 1 initiate with demand-based sensor/selector inside secondary system perimeter TS0 (22) sensing the need for heat and sending a signal to start pump-1 (13). At this moment in time, secondary system (14) temperature is below TS0 (22) set point.

With Pump-1 (13) running and water/brine flowing from split buffer (1) to secondary system (14), low temperature sensor/selector TS1 (23) located at buffer hot outlet (8) registers point water temperature. If water/brine temperature is above set point, there will be no signal to start pump-2 (17) and HSP/boiler (18). Split buffer (1)/pump-1 (13) will continue supplying hot water and pushing separation disk (2) toward the top position of the split buffer tank (1) shown in FIG. 9 until a warm-side bypass (3a) of the separation disk (2) gets aligned with hot outlet (8) of the buffer tank (1). At that point, pump-1 (13) will recirculate warm water along system loop "split buffer (1)→buffer system supply line (12)→secondary system (14)→buffer system return line (15)→split buffer (1)" via the warm side bypass (3a) until any excess heat remaining in the water is released into the secondary system (14) and TS1 (23) registers a water temperature falling below set point. TS1 (23) will then triggers on pump-2 (17), and with time delay, HSP/boiler (18). Pump-1 (13) will run continuously until secondary system (14) temperature reaches TS0 (22) set point indicating that the demand for heat is mitigated.

Figure 10:
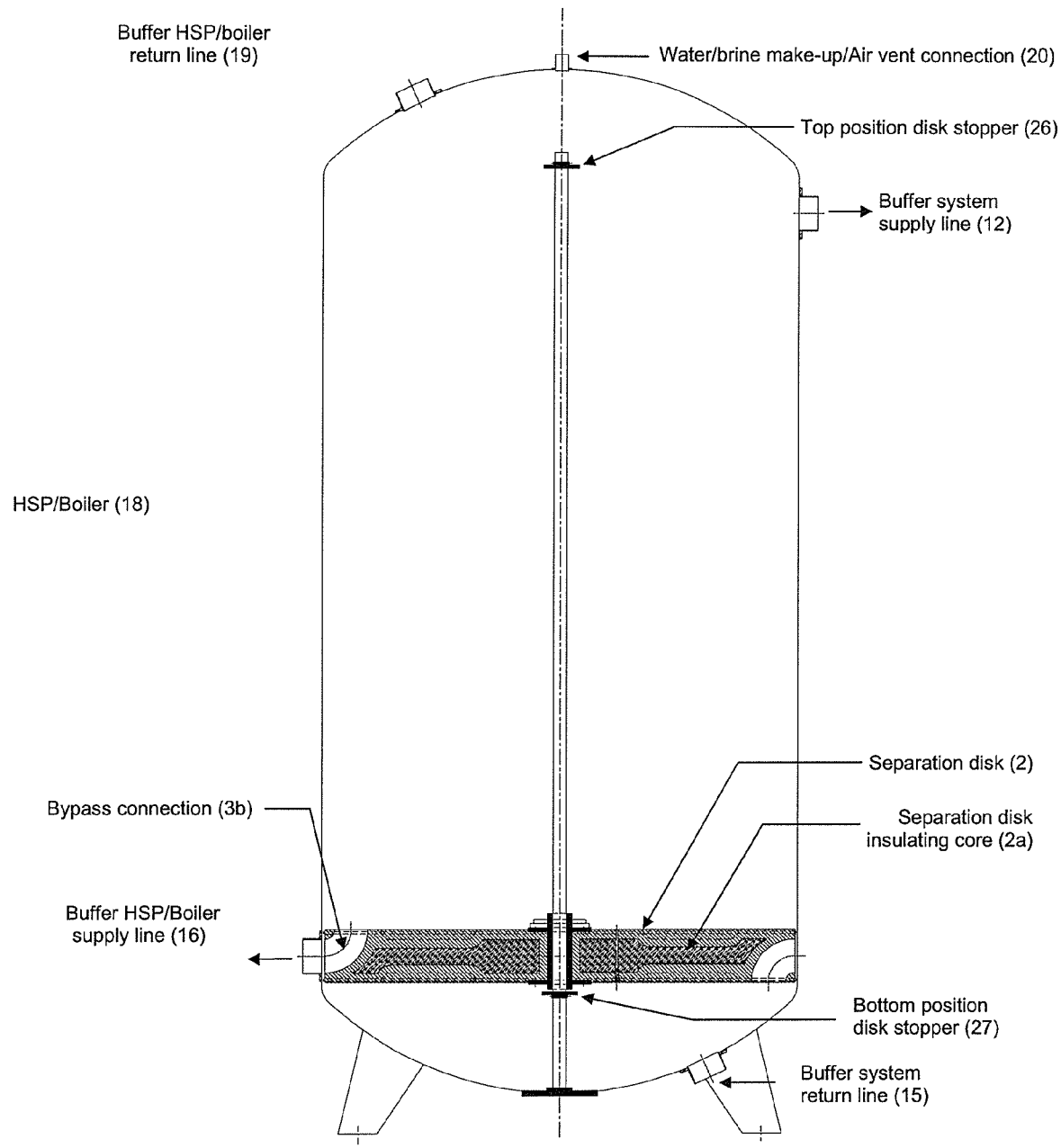
FIG. 10 is a cross-sectional view of the split buffer/separation disk operating at a bottom position
Figure 11:
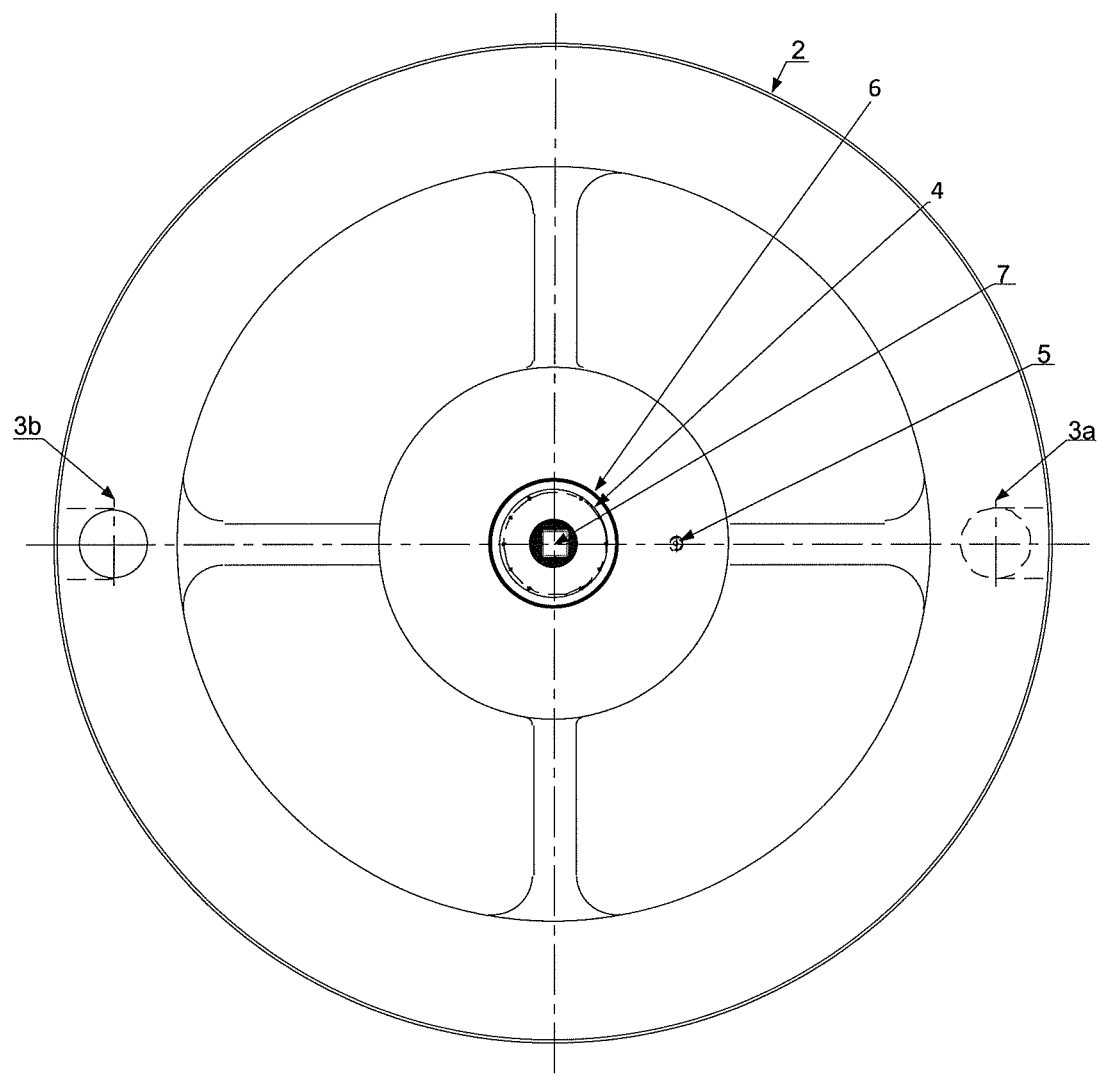
FIG. 11 is a plan view of the separation disk

Once demand in secondary system (14) gets satisfied, TS0 (22) will shut off pump-1 (13). HSP/boiler (18)/pump-2 (17) will continue running/loading split buffer (1) with hot water/brine until separation disk (2) reaches the bottom position of the split buffer tank (1) shown in FIG. 10, aligning a hot-side bypass (3b) of the separation disk (2) with buffer warm-outlet (11) of the buffer tank (1). At that point, pump-2 (17) will continue recirculating water along the HSP/boiler loop "split buffer (1)→buffer HSP/boiler supply line (16)→HSP/boiler (18)→buffer HSP/boiler return line (19)→split buffer (1)" via the hot side bypass (3b) until water/brine temperature reaches high temperature sensor TS2 (24) set point, dictated by the outdoor reset control ORC (28). TS2 (24) then will shut-off HSP/boiler (18), and with time delay, pump-2 (17). This will leave split buffer (1) thermally loaded and resting for the next cycle.

When running concurrently, pump-1 (13) and pump-2 (17) will create an operational valet on the separation disk (2) that now moves up and down inside the split buffer, obeying HSP/boiler (18) and secondary system (14) water flow demand and return. Both served by pump-1 (13) and pump-2 (17). Pump-1 (13) and pump-2 (17) operate concurrently with no discharge counterpressure (other than loop pressure losses) that forces any of the pumps to fight. Pump-1 (13) is always discharging in the suction section of pump-2 (17) and vice versa.

Low temperature sensor/selector TS1 (23) will operate only when pump-1 (13) is on. This prevents pump-2 (17) and HSP/boiler (18) from operating when supply line (12) gets cold and the secondary system is not calling for heat.

Split buffer (1) thermal reloading cycle will not only be initiated by a new demand for heat for secondary system (14); but also, by additional high temperature sensor (TS3) (25), added to split buffer (1) to maintain a high water/brine temperature during long resting periods. It should be used only if additional extra time for secondary system recovery is not allowed by the HVAC system. High temperature set point for TS3 (25) is dictated by the outdoor reset control ORC (28).

Outdoor reset control ORC (28), is a commonly used microprocessor-based control designated to regulate supply water/brine temperature based on outdoor temperature. Automatic reset ratio calculation sets the relationship between outdoor temperature and supply water/brine temperature (heating curve) to provide optimum control and comfort. As the outdoor temperature changes, the control adjusts firing rate of the boiler or running time to compensate for exterior heat loss.

ORC (28) will automated high temperature set point for TS2 (24) and (TS3) (25). And because it matches heat loss from the secondary system with HSP/boiler required output, it will optimize energy conservation in a system that will operate at the lowest practical return water temperature.

2.2. Operation Notes

Figure 9:
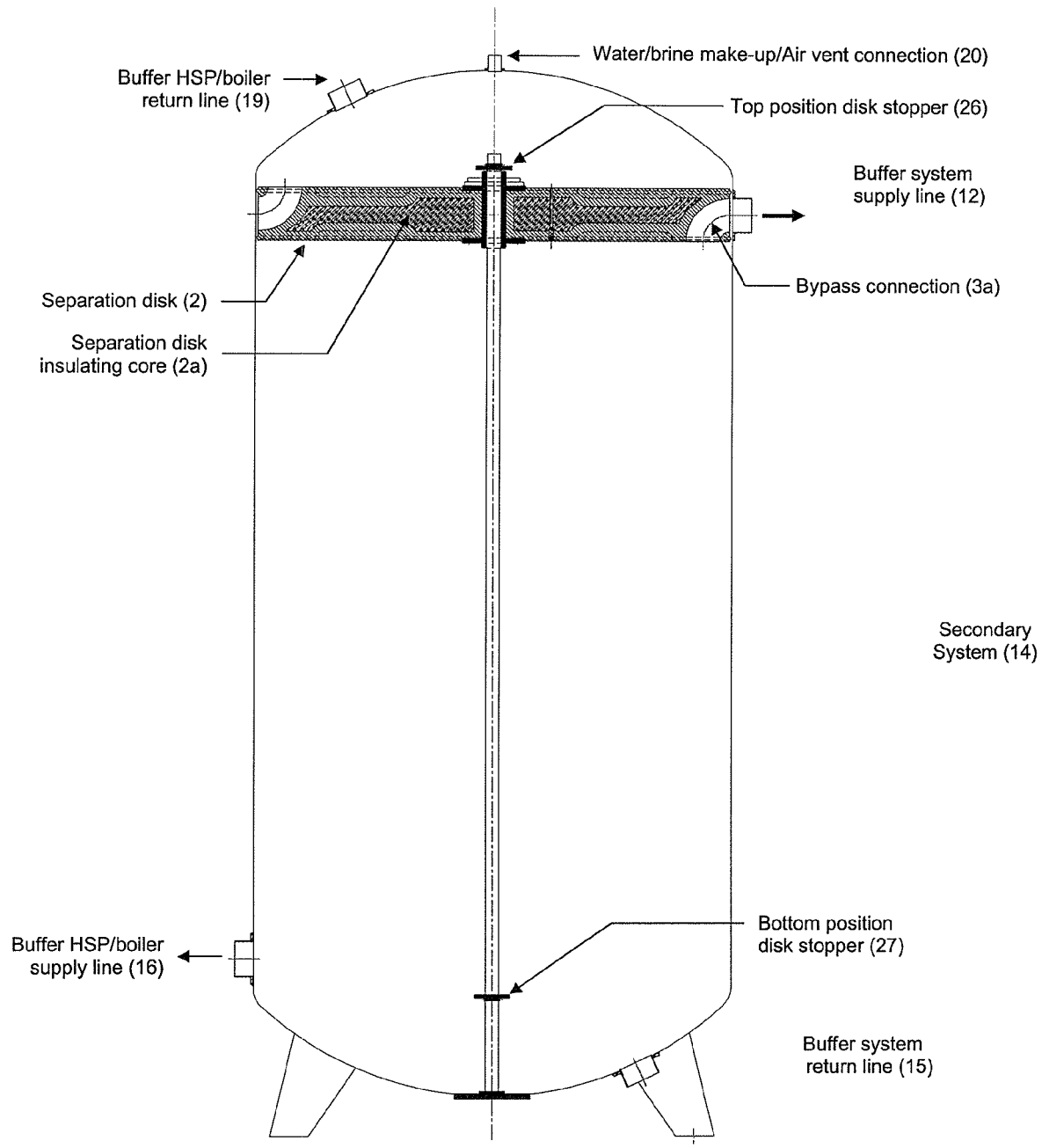
FIG. 9 is a cross-sectional view of a split buffer/separation disk operating at a top position

Bypass connection (3a) and (3b) in the separation disk (2) (as it is shown in FIG. 9, 10, 11) allow pumps to bypass flow during top or bottom disk positions. During top position (FIG. 9), with pump-1 (13) running, warm-side bypass (3a) will line up with hot outlet (8) allowing water/brine to freely recirculate along system loop. Once low temperature sensor TS1 (23) registers recirculating water/brine temperature being below set point, it will start pump-2(17), and with time delay HSP/boiler (18), to reinitiate thermal loading. During bottom position (FIG. 10) with pump-2 (17) running, hot-side bypass (3b) will line up with warm outlet (11) allowing hot water/brine to freely recirculate along HSP/boiler loop. Once high temperature sensor TS2 (24) registers recirculating water/brine temperature being on target, it will shut-off thermal reloading sending the system to a temporary rest. Both loops operate independently and complementing one another.

Top position disk stopper (26) and bottom position disk stopper (27) will limit the separation disk run along guide bar (7). During disk top position (see FIG. 9), it allows disk warm-side bypass (3a) to line up with hot outlet (8). During disk bottom position (see FIG. 10), it allows disk hot-side bypass (3b) to line up with warm outlet (11).

Each bypass curves through ninety degrees, first extending axially into the disk just inward from its circular cylindrical periphery and then turning through ninety degrees to extend radially out of the disk through the disks peripheral edge, which otherwise seals to the internal cylindrical surface of the tank's peripheral wall closing concentrically around the guide bar 7. The radially opening end of the bypass communicates with the respective one of the supply lines (12, 16) when one side of the disc, specifically the side of the disk opposite the other end of the bypass, seats against the respective stopper (26, 27). This seating or stopping of the disc acts to block further sliding of the disk along the guide bar. The warm side bypass (3a) extends into the bottom face of the disk so as to fluidly communicate only with the warm water or brine and buffer warm inlet (9) below the disk, while the hot side bypass (3b) extends into the top face of the disk so as to fluidly communicate with the hot water or brine and buffer hot inlet (10) above the disk.

The guide bar (7) is illustrated as centrally positioned in the buffer tank and as having a square cross-section closely fitting in a similarly sized passage of square section extending through the hub of the disk so that a sliding seal is formed between the hub and the guide bar to prevent water or brine from crossing the disk from on side thereof to the other through the hub, while allowing sliding of the disk along the guide bar. The straight-sides of the square cross-sections of the tube and hub passage cooperate to prevent relative rotation between the two, thereby maintaining the bypass passages in the disk in the same radial planes of the tank and bar longitudinal axes as the respective outlets of the tank. It will be appreciated that other non-circular cross-sectional shapes can be used to establish such rotation-preventing cooperation between the disk and the guide bar. The guide bar and disk also cooperate to substantially maintain the orientation of the disk's plane relative to the bar's longitudinal axis to thereby keep the outer periphery of the disk near the inner periphery of the tank and thus minimize fluid leakage and mixing across the disc.

Figure 12:
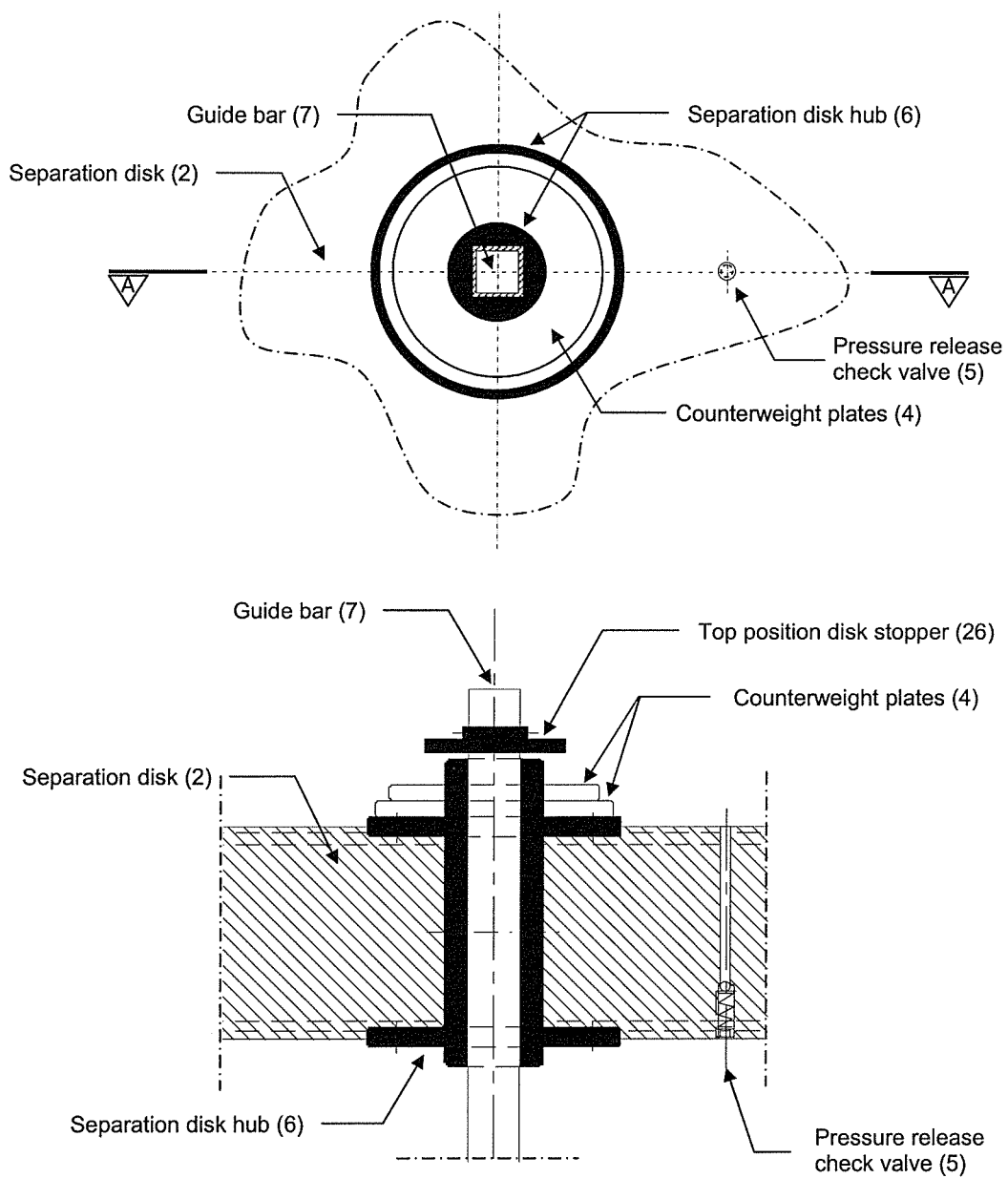
FIG. 12 shows separation disk hub details, including cross-sectional view A-A with details on counterweight plates and a pressure release check valve. Separation ring insulating core (2a in FIGS. 9 & 10) is not shown, to simplify the drawings.

Because separation disk (2) and the insulating manufacturing material injected in the core (2a) of the disk will vary in density when compared to water/brine or any other liquid being used, weight balancing is carried out through a set of counterweight plates positioned in a hub (6) of the disk (as seen in FIG. 12) in order to counterbalance the buoyancy effect of the disk. The purpose is to make the disk as neutrally buoyant or effectively weightless as possible when placed inside the tank (Buoyant force−counterweight=0), eliminating its tendency to float to the top or sink to bottom position. This may happen when the system is resting for long period of time. In any case, split buffer will maintain its operability due to the configuration in hydraulic connections (12), (15), (16), (19) and to DCS instructions that maintains the appropriate sequence of operation at any disk position.

Separation disk is provided with pressure release check valve (5) (See FIG. 12) to balance any pressure differential that may arise from make-up water/brine feeding through the make-up/air vent connection line (20) (see FIG. 1, 9, 10). Pressure release check valve (5) allows forward flow from hot section atop to the warm section in the bottom and closes to block reverse flow. This allows achievement of a pressure balance across the disc, thereby preventing the disk from sinking when the system is resting.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The embodiments of the invention in which an exclusive property or privilege is claimed are defined as follows:

1. A heating/cooling system comprising a heat source provider, a secondary system, and a split buffer tank (1) that comprises a separation disk (2) freely movable upward and downward within the split buffer tank to make room for hot and warm fluid storage on opposite sides of the disk, a sealed relationship between a periphery of the separation disk and an internal surface of a peripheral wall of the split buffer tank, two disk flow bypasses (3a, 3b) defined on the separation disk inside the tank for respective loop flow functionality between the split buffer tank and each of the heat source provider and the secondary system (14), and hydraulic connections (12), (15), (16), (19) to interconnect the heat source provider and the secondary system (14) to the split buffer tank (1), wherein:
the tank comprises first and second disk stoppers (26, 27) disposed respectively proximate to opposing first and second ends of the tank in order to block movement of the disk (2) past respective stop positions abutted against said disk stoppers (26, 27);
the hydraulic connections comprise a secondary system supply line (12) connected to the secondary system (14) and opening into the tank (1) through a circumferential wall thereof near the first end of the tank, a heat source provider supply line (16) connected to the heat source provider (18) and opening into the tank through the circumferential wall near the second end of the tank, a secondary system return line (15) connected to the secondary system (14) and opening into the tank (1) between the heat source provider supply line (16) and the second end of the tank, and a heat source provider return line (19) connected to the heat source provider (18) and opening into the tank between the secondary system supply line and the first end of the tank; and
the disk flow bypasses (3a, 3b) comprise a hot side bypass (3b) having one axially-opening end at a first face of the disk that faces toward the first end of the tank and a radially-opening end at the periphery of the disk at a position that aligns with the heat source provider supply line when the disk is in the second stop position, and a warm side bypass (3a) having one axially-opening end at a second face of the disk that faces toward the second end of the tank and another open end at the periphery of the disk at a position that aligns with the secondary system supply line when the disk is in the first stop position, whereby looped flow through the secondary system is enabled by the warm side bypass (3a) in the second stop position of the disk and looped flow through the heat source provider is enabled by the hot side bypass (3b) in the first stop position of the disk.

2. The heating/cooling system according to claim 1, in which the split buffer tank (1) comprises the following:
a) a hot-outlet (8) hydraulically connected to the secondary system supply line (12) to convey stored hot fluid from the split buffer tank (1) to the secondary system (14) to satisfy demand for heat;
b) a warm-inlet (9) hydraulically connected to the secondary system return line (15) to convey secondary system (14) return warm fluid to split buffer tank (1) for storage;
c) a hot-inlet (10) hydraulically connected to the heat source provider return line (19) to convey hot fluid from the heat source provider (18) to the split buffer tank (1) for storage;
d) a warm-outlet (11) hydraulically connected to the heat source provider supply line (16) to convey stored warm fluid from the split buffer (1) tank to the heat source provider (18) for reheating;
e) the separation disk (2), which functions to hydraulically separate hot fluid inflow from the heat source provider (18) from warm fluid inflow from the secondary system (14), and to serve as an insulating wall for thermal separation between hot and warm sections of the tank, the separation disk comprising the following:
i) an insulating core (2a) which functions to thermally insulate the hot section of the split buffer tank (1) from the warm section;
ii) the warm-side bypass (3a) to allow a pump-1 (13) to recirculate fluid in a system loop during positioning of the disk in a top position;
iii) the hot-side bypass (3b) to allow a pump-2 (17) to recirculate fluid in a heat source provider loop during positioning of the disk in a bottom position; and
iv) a pressure release check valve (5) hydraulically connecting a hot face of the disk with a warm face of the disk in order to eliminate pressure differential between the hot and warm sections of the tank that may arise from a make-up fluid connection (20) on the split buffer tank;
f) a guide bar, which is in the form of a center guide squared bar (7) to guide the separation disk up and down along the split buffer tank (1) and to prevent rotation of the disk from causing misalignment of the warm-side bypass (3a) with the hot outlet (8), or the hot-side bypass (3b) with the warm outlet (11), at an edge of the separation disk (2), the disk being displaceable up and down along the center guide bar (7) to allow hot and warm fluid accumulation during thermal recharging and discharging of the split buffer tank (1);
g) a separation disk hub (6) to secure the separation disk to the center guide bar (7) and to accommodate a set of counterweight plates (4);
h) the set of counterweight plates (4) balancing buoyancy of the separation disk to make the separation disk effectively weightless when placed inside the split buffer tank (1);
i) the first disk stopper (26), which is situated proximate a top of the tank that is defined by the first end thereof to limit upward, displacement of the disk (2) past the first stop position lining up the warm-side bypass (3a) with the hot outlet (8);
j) the second disk stopper (27), which is situated proximate a bottom of the tank that is defined by the second end thereof to limit downward displacement of the disk (2) past the second stop position lining up the hot side bypass (3b) with the warm outlet (11);
k) a guide bar attachment (21) to mechanically secure the guide bar (7) to a bottom of the split buffer tank (1); and
l) a pressurized fluid make-up & air vent connection (20) to maintain continuous fluid supply to the system and to allow for allocation of air vent equipment in association with the split buffer tank.

3. The heating/cooling system according to claim 1 in which a Distributed Control System (DCS) logic arranged to work independently or in conjunction with additional DCS controllers comprises the following:
a) a demand-based sensor/selector (TSO) (22) inside the Secondary System (14) perimeter which functions to monitor an inner temperature and call for heat, starting a pump-1 (13) operable between the buffer tank and the secondary system, if the inner temperature falls below a preset value;
b) a fluid temperature sensor/selector (TS1) (23) located at a buffer system supply line (12), between a hot outlet (8) of the buffer tank and the pump-1 (13), the temperature sensor/selector registering a first point fluid temperature, operating only when the pump-1 (13) is ON, and if the first point fluid temperature falls below a set point, signaling to start first a pump-2 (17) operable between the buffer tank and the heat source provider and, with a time delay, start the heat source provider (18) to reload the split buffer tank (1) with hot fluid; and
c) another fluid temperature sensor/selector (TS2) (24) located at a buffer heat source provider supply line (16), between the pump-2 (17) and a warm outlet (11) of the buffer tank to register a second point fluid temperature and shut-off the pump-2 (17), and with time delay, shut off the heat source provider (18) if the second point fluid temperature rises to a second preset value.

4. Heating/cooling system according to claim 1, in which the heat source provider is a direct heating device.

5. The heating/cooling system according to claim 1, in which the heat source provider is an indirect heating device.

6. The heating/cooling system according to claim 4, in which the direct heating device is a boiler.

7. The heating/cooling system according to claim 4, in which the direct heating device is a heat pump.

8. The heating/cooling system according to claim 4, in which the direct heating device is a solar heating arrangement.

9. The heating/cooling system according to claim 4, in which the direct heating device is a solid fuel heating device.

10. The heating/cooling system according to claim 4, in which the direct heating device is a wood fuel heating device.

11. The heating/cooling system according to claim 5, in which the indirect heating device comprises at least one heat exchanger.

12. The heating/cooling system according to claim 1, in which the secondary system comprises an HVAC system for regulating conditions of an enclosed environment.

13. The heating/cooling system according to claim 12, in which the HVAC system is arranged to introduce fresh outdoor air into the enclosed environment.

14. The heating/cooling system according to claim 1, in which the secondary system is associated with industrial thermal processes involving cooling/heating applications.

15. A heating/cooling system operating on the basis of a novel split buffer tank (1) comprising a separations disk (2), a guide bar (7) adapted inside the split buffer tank to freely allow the separation disk to move up and down along the guide bar to make room for hot and warm fluid storage on opposite sides of the disk, two disk flow bypasses (3a, 3b) for respective loop flow functionality between the split buffer tank and each of a heat source provider and a secondary system (14), and hydraulic connections (12), (15), (16), (19) to interconnect the heat source provider and the secondary system (14) to the split buffer tank (1), wherein the the split buffer tank (1) further comprises the following:
   a) a hot-outlet (8) hydraulically connected to a buffer system supply line (12) to convey stored hot fluid from the split buffer tank (1) to the secondary system (14) to satisfy demand for heat;
   b) a warm-inlet (9) hydraulically connected to a buffer system return line (15) to convey secondary system (14) return warm fluid to split buffer tank (1) for storage;
   c) a hot-inlet (10) hydraulically connected to a buffer heat source provider return line (19) to convey hot fluid from the heat source provider (18) to the split buffer tank (1) for storage;
   d) a warm-outlet (11) hydraulically connected to a buffer heat source provider supply line (16) to convey stored warm fluid from the split buffer (1) tank to the heat source provider (18) for reheating;
   e) the separation disk (2), which functions to hydraulically separate hot fluid inflow from the heat source provider (18) from warm fluid inflow from the secondary system (14), and to serve as an insulating wall for thermal separation between hot and warm sections of the tank, the separation disk comprising the following:
      i) an insulating core (2a) which functions to thermally insulate the hot section of the split buffer tank (1) from the warm section;
      ii) a separation disk warm-side bypass (3a) to allow a pump-1 (13) to recirculate fluid in a system loop during positioning of the disk in a top position;
      iii) a separation disk hot-side bypass (3b) to allow a pump-2 (17) to recirculate fluid in a heat source provider loop during positioning of the disk in a bottom position; and
      iv) a pressure release check valve (5) hydraulically connecting a hot face of the disk with a warm face of the disk in order to eliminate pressure differential between the hot and warm sections of the tank that may arise from a make-up fluid connection (20) on the split buffer tank;
   f) the guide bar, which is a center guide squared bar (7) to guide the separation disk up and down along the split buffer tank (1) and to prevent rotation of the disk from causing misalignment of the warm-side bypass (3a) with the hot outlet (8), or the hot-side bypass (3b) with the warm outlet (11), at an edge of the separation disk (2), the disk being displaceable up and down along the center guide bar (7) to allow hot and warm fluid accumulation during thermal recharging and discharging of the split buffer tank (1);
   g) a separation disk hub (6) to secure the separation disk to the center guide bar (7) and to accommodate a set of counterweight plates (4);
   h) the set of counterweight plates (4) balancing buoyancy of the separation disk to make the separation disk effectively weightless when placed inside the split buffer tank (1);
   i) a top position disk stopper (26) to limit displacement of the disk (2) when going to the top position lining up the warm-side bypass (3a) with the hot outlet (8);
   j) a bottom position disk stopper (27) to limit displacement of the disk (2) when going to the bottom position lining up the hot side bypass (3b) with the warm outlet (11);
   k) a guide bar attachment (21) to mechanically secure the guide bar (7) to a bottom of the split buffer tank (1); and
   l) a pressurized fluid make-up & air vent connection (20) to maintain continuous fluid supply to the system and to allow for allocation of air vent equipment in association with the split buffer tank.

\* \* \* \* \*